(12) United States Patent
Fourcand

(10) Patent No.: US 8,605,757 B2
(45) Date of Patent: Dec. 10, 2013

(54) CLOSED-LOOP CLOCK SYNCHRONIZATION

(75) Inventor: Serge Francois Fourcand, Fairview, TX (US)

(73) Assignee: Futurewei Technologies, Inc., Plano, TX (US)

( * ) Notice: Subject to any disclaimer, the term of this patent is extended or adjusted under 35 U.S.C. 154(b) by 580 days.

(21) Appl. No.: 12/842,794

(22) Filed: Jul. 23, 2010

(65) Prior Publication Data
US 2010/0284421 A1 Nov. 11, 2010

Related U.S. Application Data

(62) Division of application No. 11/971,386, filed on Jan. 9, 2008, now Pat. No. 7,787,498.

(60) Provisional application No. 60/886,833, filed on Jan. 26, 2007.

(51) Int. Cl.
*H04J 3/04* (2006.01)
(52) U.S. Cl.
CPC ..................................... *H04J 3/047* (2013.01)
USPC .......................................................... 370/535
(58) Field of Classification Search
CPC ..................................................... H04J 3/047
See application file for complete search history.

(56) References Cited

U.S. PATENT DOCUMENTS

| | | |
|---|---|---|
| 5,303,241 A | 4/1994 | Takada et al. |
| 5,361,261 A | 11/1994 | Edem et al. |
| 5,367,524 A | 11/1994 | Rideout, Jr. et al. |
| 5,434,848 A | 7/1995 | Chimento, Jr. et al. |
| 5,696,798 A | 12/1997 | Wright et al. |
| 5,802,051 A | 9/1998 | Petersen et al. |
| 5,933,607 A | 8/1999 | Tate et al. |

(Continued)

FOREIGN PATENT DOCUMENTS

| | | |
|---|---|---|
| CN | 1293843 | 5/2001 |
| CN | 1352841 A1 | 6/2002 |

(Continued)

OTHER PUBLICATIONS

Foreign Communication From a Related Counterpart Application—International Search Report and Written Opinion, PCT/CN2008/070037, Apr. 17, 2008, 10 pages.

(Continued)

*Primary Examiner* — Steven H Nguyen
*Assistant Examiner* — Phuongchau B Nguyen
(74) *Attorney, Agent, or Firm* — Conley Rose, P.C.; Grant Rodolph; Rayhao Chung

(57) ABSTRACT

A network comprising a destination node, and a plurality of source nodes configured to transmit high-priority data and low-priority data to the destination node, wherein the source nodes correlate the transmission of the high-priority data to the destination node such that the high-priority data from each source node does not substantially contend with the high-priority data from the other source nodes upon arrival at the destination node. Also disclosed is a network component comprising at least one processor configured to implement a method comprising creating a periodic time window, partitioning the time window into low-priority time-bands and high-priority time-bands, placing a plurality of high-priority packets in the high priority time-bands, and placing a plurality of low-priority packets in the low-priority time-bands.

16 Claims, 6 Drawing Sheets

(56) References Cited

U.S. PATENT DOCUMENTS

| | | | |
|---|---|---|---|
| 6,049,541 A | 4/2000 | Kerns et al. | |
| 6,233,237 B1 | 5/2001 | Yucebay et al. | |
| 6,272,109 B1 | 8/2001 | Pei et al. | |
| 6,320,877 B1 | 11/2001 | Humphrey et al. | |
| 6,487,169 B1 | 11/2002 | Tada | |
| 6,490,248 B1 | 12/2002 | Shimojo | |
| 6,496,477 B1 | 12/2002 | Perkins et al. | |
| 6,501,810 B1 | 12/2002 | Karim et al. | |
| 6,570,890 B1 | 5/2003 | Keenan et al. | |
| 6,570,891 B1 * | 5/2003 | Arimilli | 370/536 |
| 6,577,631 B1 | 6/2003 | Keenan et al. | |
| 6,633,566 B1 | 10/2003 | Pierson, Jr. | |
| 6,674,750 B1 | 1/2004 | Castellano | |
| 6,674,756 B1 | 1/2004 | Rao et al. | |
| 6,693,909 B1 | 2/2004 | Mo et al. | |
| 6,754,206 B1 | 6/2004 | Nattkemper et al. | |
| 6,771,614 B1 | 8/2004 | Jones, IV et al. | |
| 6,816,500 B1 | 11/2004 | Manette et al. | |
| 6,847,644 B1 | 1/2005 | Jha | |
| 6,859,458 B2 | 2/2005 | Yuang et al. | |
| 6,868,093 B1 | 3/2005 | Bohm et al. | |
| 6,874,048 B2 | 3/2005 | Knapp et al. | |
| 6,944,163 B2 | 9/2005 | Bottorff et al. | |
| 6,959,151 B1 | 10/2005 | Cotter et al. | |
| 6,985,497 B2 | 1/2006 | Hsu et al. | |
| 6,985,499 B2 | 1/2006 | Elliot | |
| 6,999,479 B1 | 2/2006 | Jha | |
| 7,007,099 B1 | 2/2006 | Donati et al. | |
| 7,031,341 B2 | 4/2006 | Yu | |
| 7,043,651 B2 | 5/2006 | Aweya et al. | |
| 7,089,485 B2 | 8/2006 | Azadet et al. | |
| 7,103,124 B1 | 9/2006 | Lindskog et al. | |
| 7,139,338 B2 | 11/2006 | Wilson et al. | |
| 7,188,189 B2 | 3/2007 | Karol et al. | |
| 7,236,126 B2 | 6/2007 | Jeon et al. | |
| 7,257,087 B2 | 8/2007 | Grovenburg | |
| 7,305,002 B1 | 12/2007 | Ageby et al. | |
| 7,324,537 B2 | 1/2008 | Samudrala et al. | |
| 7,403,514 B1 | 7/2008 | Moulsley | |
| 7,436,765 B2 | 10/2008 | Sisto et al. | |
| 7,453,885 B2 | 11/2008 | Rogers | |
| 7,463,709 B2 | 12/2008 | Raphaeli et al. | |
| 7,496,112 B1 | 2/2009 | Danielson et al. | |
| 7,519,747 B1 | 4/2009 | Cory et al. | |
| 7,613,212 B1 | 11/2009 | Raz et al. | |
| 7,646,710 B2 | 1/2010 | Christie, IV | |
| 7,720,101 B2 | 5/2010 | Chapman et al. | |
| 7,986,700 B2 | 7/2011 | Fourcand | |
| 2001/0043603 A1 | 11/2001 | Yu | |
| 2001/0053130 A1 | 12/2001 | Tanaka et al. | |
| 2001/0053149 A1 | 12/2001 | Mo et al. | |
| 2002/0068593 A1 | 6/2002 | Deltour et al. | |
| 2002/0087716 A1 | 7/2002 | Mustafa | |
| 2002/0131425 A1 | 9/2002 | Shalom | |
| 2002/0141456 A1 | 10/2002 | Wang et al. | |
| 2002/0163926 A1 | 11/2002 | Moharram | |
| 2002/0167955 A1 | 11/2002 | Shimojo | |
| 2002/0176389 A1 | 11/2002 | Colombo et al. | |
| 2003/0095568 A1 | 5/2003 | Tominaga et al. | |
| 2003/0117899 A1 | 6/2003 | Eidson | |
| 2003/0147348 A1 | 8/2003 | Jiang | |
| 2003/0161307 A1 | 8/2003 | Lo | |
| 2003/0174700 A1 | 9/2003 | Ofek et al. | |
| 2003/0179755 A1 | 9/2003 | Fraser | |
| 2003/0219042 A1 | 11/2003 | Tosa | |
| 2004/0001483 A1 | 1/2004 | Schmidt et al. | |
| 2004/0001502 A1 | 1/2004 | Garmire et al. | |
| 2004/0028408 A1 | 2/2004 | Cox et al. | |
| 2004/0047367 A1 | 3/2004 | Mammen | |
| 2004/0062265 A1 | 4/2004 | Poledna | |
| 2004/0063401 A1 | 4/2004 | Meckelburg et al. | |
| 2004/0066775 A1 | 4/2004 | Grovenburg | |
| 2004/0071166 A1 | 4/2004 | Yen et al. | |
| 2004/0076166 A1 | 4/2004 | Patenaude | |
| 2004/0120438 A1 | 6/2004 | Forte | |
| 2004/0151125 A1 | 8/2004 | Holmeide et al. | |
| 2004/0177162 A1 | 9/2004 | Wetzel et al. | |
| 2004/0179551 A1 | 9/2004 | Lentine et al. | |
| 2004/0208554 A1 | 10/2004 | Wakai et al. | |
| 2004/0213149 A1 | 10/2004 | Mascolo | |
| 2004/0252688 A1 | 12/2004 | May et al. | |
| 2005/0041691 A1 | 2/2005 | Laufer et al. | |
| 2005/0099988 A1 | 5/2005 | Wang et al. | |
| 2005/0117576 A1 | 6/2005 | McDysan et al. | |
| 2005/0129028 A1 | 6/2005 | Peeters et al. | |
| 2005/0141568 A1 | 6/2005 | Kwak et al. | |
| 2005/0175013 A1 | 8/2005 | Le Pennec et al. | |
| 2005/0190796 A1 | 9/2005 | Date et al. | |
| 2005/0254484 A1 | 11/2005 | Barzegar et al. | |
| 2005/0278457 A1 | 12/2005 | Hall et al. | |
| 2005/0281217 A1 | 12/2005 | Mottier | |
| 2006/0015507 A1 | 1/2006 | Butterworth et al. | |
| 2006/0092985 A1 | 5/2006 | Cho et al. | |
| 2006/0104302 A1 | 5/2006 | Cho et al. | |
| 2006/0109864 A1 | 5/2006 | Oksman | |
| 2006/0123126 A1 | 6/2006 | Kim et al. | |
| 2006/0176905 A1 | 8/2006 | Liu et al. | |
| 2006/0182144 A1 | 8/2006 | Dove et al. | |
| 2006/0233116 A1 | 10/2006 | Kyusojin et al. | |
| 2006/0239300 A1 | 10/2006 | Hannel et al. | |
| 2006/0256768 A1 | 11/2006 | Chan | |
| 2006/0274791 A1 | 12/2006 | Garcia et al. | |
| 2007/0008958 A1 | 1/2007 | Clemm et al. | |
| 2007/0014372 A1 | 1/2007 | Hershbarger | |
| 2007/0022209 A1 | 1/2007 | Delvai et al. | |
| 2007/0031153 A1 | 2/2007 | Aronson et al. | |
| 2007/0064587 A1 | 3/2007 | Langley et al. | |
| 2007/0076605 A1 | 4/2007 | Cidon et al. | |
| 2007/0097926 A1 | 5/2007 | Liu et al. | |
| 2007/0121661 A1 | 5/2007 | Ohta et al. | |
| 2007/0140127 A1 | 6/2007 | Frei | |
| 2007/0192515 A1 | 8/2007 | Kraus | |
| 2007/0201356 A1 | 8/2007 | Liao et al. | |
| 2007/0201365 A1 | 8/2007 | Skoog et al. | |
| 2007/0206602 A1 | 9/2007 | Halabi et al. | |
| 2007/0206603 A1 | 9/2007 | Weich et al. | |
| 2007/0206604 A1 | 9/2007 | Best et al. | |
| 2007/0206709 A1 | 9/2007 | Khermosh et al. | |
| 2007/0211720 A1 | 9/2007 | Fuchs et al. | |
| 2007/0211750 A1 | 9/2007 | Li et al. | |
| 2007/0222648 A1 | 9/2007 | Sontag et al. | |
| 2007/0258419 A1 | 11/2007 | Zhao et al. | |
| 2007/0297375 A1 | 12/2007 | Bonta et al. | |
| 2007/0299987 A1 | 12/2007 | Parker et al. | |
| 2008/0031136 A1 | 2/2008 | Gavette et al. | |
| 2008/0043732 A1 | 2/2008 | Desai et al. | |
| 2008/0071924 A1 * | 3/2008 | Chilukoor | 709/240 |
| 2008/0074996 A1 | 3/2008 | Fourcand | |
| 2008/0075002 A1 | 3/2008 | Fourcand | |
| 2008/0075069 A1 | 3/2008 | Fourcand | |
| 2008/0075110 A1 | 3/2008 | Fourcand | |
| 2008/0075120 A1 | 3/2008 | Fourcand | |
| 2008/0075121 A1 | 3/2008 | Fourcand | |
| 2008/0075122 A1 | 3/2008 | Fourcand | |
| 2008/0075123 A1 | 3/2008 | Fourcand | |
| 2008/0075124 A1 | 3/2008 | Fourcand | |
| 2008/0075127 A1 | 3/2008 | Fourcand | |
| 2008/0075128 A1 | 3/2008 | Fourcand | |
| 2008/0123541 A1 | 5/2008 | Dielissen et al. | |
| 2008/0130689 A1 | 6/2008 | Kumar et al. | |
| 2008/0137675 A1 | 6/2008 | Pauwels | |
| 2008/0181114 A1 | 7/2008 | Fourcand | |
| 2008/0250469 A1 | 10/2008 | Agnoli et al. | |
| 2009/0168797 A1 | 7/2009 | Danielson et al. | |
| 2009/0254685 A1 | 10/2009 | Diepstraten et al. | |
| 2009/0274172 A1 | 11/2009 | Shen et al. | |
| 2010/0135314 A1 | 6/2010 | Fourcand | |
| 2010/0135315 A1 | 6/2010 | Fourcand | |
| 2010/0316069 A1 | 12/2010 | Fourcand | |
| 2011/0255402 A1 | 10/2011 | Fourcand | |

(56) References Cited

U.S. PATENT DOCUMENTS

FOREIGN PATENT DOCUMENTS

| | | |
|---|---|---|
| CN | 1512683 A | 7/2004 |
| CN | 1516463 A | 7/2004 |
| CN | 1522077 | 8/2004 |
| CN | 1522510 A | 8/2004 |
| CN | 1529471 A | 9/2004 |
| CN | 1571348 | 1/2005 |
| CN | 1575568 A | 2/2005 |
| CN | 1601951 A | 3/2005 |
| CN | 1710828 | 12/2005 |
| CN | 1728720 A | 2/2006 |
| CN | 1767499 | 5/2006 |
| CN | 1770673 | 5/2006 |
| CN | 1773887 | 5/2006 |
| CN | 1788501 A | 6/2006 |
| CN | 1855935 | 11/2006 |
| EP | 1091529 A | 4/2001 |
| EP | 1655885 | 5/2006 |
| EP | 1771027 A1 | 4/2007 |
| GB | 2366161 A | 2/2002 |
| JP | 2003188912 A | 7/2003 |
| WO | 9956422 | 11/1999 |
| WO | 02099578 A | 12/2002 |
| WO | 03017543 A1 | 2/2003 |
| WO | 03032539 A1 | 4/2003 |
| WO | 03087984 A2 | 10/2003 |
| WO | 2005101755 A1 | 10/2005 |
| WO | 2006032583 A1 | 3/2006 |
| WO | 2006051465 A1 | 5/2006 |
| WO | 2006056415 A1 | 6/2006 |

OTHER PUBLICATIONS

Foreign Communication From a Related Counterpart Application—International Search Report and Written Opinion, PCT/CN2008/070038, Apr. 17, 2008, 6 pages.
Foreign Communication From a Related Counterpart Application—International Search Report and Written Opinion, PCT/CN2008/070045, Apr. 17, 2008, 7 pages.
Foreign Communication From a Related Counterpart Application—International Search Report and Written Opinion, PCT/CN2008/070046, Apr. 17, 2008, 6 pages.
Foreign Communication From a Related Counterpart Application—International Search Report and Written Opinion, PCT/CN2008/070183, May 8, 2008, 11 pages.
Foreign Communication From a Related Counterpart Application—International Search Report and Written Opinion, PCT/CN2008/070632, Jul. 10, 2008, 5 pages.
Foreign Communication From a Related Counterpart Application—International Search Report and Written Opinion, PCT/CN2008/070630, Jul. 3, 2008, 8 pages.
Foreign Communication From a Related Counterpart Application—International Search Report and Written Opinion, PCT/CN2008/070690, Jul. 17, 2008, 7 pages.
Foreign Communication From a Related Counterpart Application—International Search Report and Written Opinion, PCT/CN2008/070717, Jul. 24, 2008, 10 pages.
Foreign Communication From a Related Counterpart Application—International Search Report and Written Opinion, PCT/CN2008/070017, Apr. 3, 2008, 6 pages.
Foreign Communication From a Related Counterpart Application—International Search Report and Written Opinion, PCT/CN2008/070005, Apr. 10, 2008, 9 pages.
Foreign Communication From a Related Counterpart Application—International Search Report and Written Opinion, PCT/CN2008/070007, Apr. 17, 2008, 8 pages.
Foreign Communication From a Related Counterpart Application—European Search Report, EP Application 08700032.9, Dec. 2, 2009, 7 pages.
Office Action dated Jan. 11, 2011, 10 pages, U.S. Appl. No. 11/735,590, filed Apr. 16, 2007.
Office Action dated Feb. 1, 2011, 10 pages, U.S. Appl. No. 11/735,590, filed Apr. 16, 2007.
Office Action dated Jan. 13, 2011, 10 pages, U.S. Appl. No. 11/735,591, filed Apr. 16, 2007.
Office Action dated Jan. 3, 2011, 16 pages, U.S. Appl. No. 11/735,592, filed Apr. 16, 2007.
Office Action dated Jun. 22, 2010, 18 pages, U.S. Appl. No. 11/735,605.
Office Action dated Oct. 27, 2010, 14 pages, U.S. Appl. No. 11/735,605.
Office Action dated Jun. 26, 2009, 15 pages, U.S. Appl. No. 11/737,803, filed Apr. 20, 2007.
Office Action—Notice of Allowance—dated Dec. 29, 2009, 16 pages U.S. Appl. No. 11/737,803, filed Apr. 20, 2007.
Foreign Communication from a counterpart application, Chinese application 200880001140.3, Office Action dated Feb. 9, 2011, 5 pages.
Foreign Communication from a counterpart application, Chinese application 200880001140.3, Partial English Translation Office Action dated Feb. 9, 2011, 7 pages.
Foreign Communication from a counterpart application, Chinese application 200880000770.9, Office Action dated Dec. 14, 2010, 7 pages.
Foreign Communication from a counterpart application, Chinese application 200880000770.9, Partial English Translation Office Action dated Dec. 14, 2010, 6 pages.
Notice of Allowance dated Jul. 19, 2010, 12 pages, U.S. Appl. No. 11/971,386, filed Jan. 9, 2008.
Notice of Allowance dated Apr. 11, 2011 7 pages, U.S. Appl. No. 11/735,602, filed Apr. 16, 2007.
Office Action—Notice of Allowance—dated Mar. 17, 2011, 9 pages, U.S. Appl. No. 11/735,605.
Notice of Allowance dated Aug. 13, 2012, 25 pages, U.S. Appl. No. 11/735,591, filed Apr. 16, 2007.
Office Action dated Aug. 6, 2012, 25 pages, U.S. Appl. No. 11/735,596, filed Apr. 16, 2007.
Notice of Allowance dated Jul. 30, 2012, 42 pages, U.S. Appl. No. 12/691,372, filed Jan. 21, 2010.
Foreign Communication From a Related Counterpart Application-European Application No. 08700043.6, European Office Action dated Jul. 20, 2012, 7 pages.
"IEEE Standard for Information Technology—Telecommunications and Information Exchange Between Systems—Local and Metropolitan Area Networks—Specific Requirements, Part 3: Carrier Sense Multiple Access With Collision Detection (CSMA/CD) Access Method and Physical Layer Specifications," IEEE 802.3™ Section One, Dec. 26, 2008, pp. 1-671.
"IEEE Standard for Information Technology—Telecommunications and Information Exchange Between Systems—Local and Metropolitan Area Networks—Specific Requirements, Part 3: Carrier Sense Multiple Access With Collision Detection (CSMA/CD) Access Method and Physical Layer Specifications," IEEE 802.3™ Section Two, Dec. 26, 2008, pp. 1-790.
"IEEE Standard for Information Technology—Telecommunications and Information Exchange Between Systems—Local and Metropolitan Area Networks—Specific Requirements, Part 3: Carrier Sense Multiple Access With Collision Detection (CSMA/CD) Access Method and Physical Layer Specifications," IEEE 802.3™ Section Three, Dec. 26, 2008, pp. 1-315.
"IEEE Standard for Information Technology—Telecommunications and Information Exchange Between Systems—Local and Metropolitan Area Networks—Specific Requirements, Part 3: Carrier Sense Multiple Access With Collision Detection (CSMA/CD) Access Method and Physical Layer Specifications," IEEE 802.3™ Section Four, Dec. 26, 2008, pp. 1-586.
"IEEE Standard for Information Technology—Telecommunications and Information Exchange Between Systems—Local and Metropolitan Area Networks—Specific Requirements, Part 3: Carrier Sense Multiple Access With Collision Detection (CSMA/CD) Access Method and Physical Layer Specifications," IEEE 802.3™ Section Five, Dec. 26, 2008, pp. 1-615.

(56) References Cited

OTHER PUBLICATIONS

Office Action dated Jun. 17, 2011, 20 pages, U.S. Appl. No. 11/735,591, filed Apr. 16, 2007.
Office Action dated Jul. 1, 2011, 18 pages, U.S. Appl. No. 11/737,800, filed Apr. 20, 2007.
Office Action dated Nov. 21, 2011, 5 pages, U.S. Appl. No. 11/737,800, filed Apr. 20, 2007.
Office Action dated Jun. 9, 2011, 17 pages, U.S. Appl. No. 11/735,596, filed Apr. 16, 2007.
Office Action dated Oct. 25, 2011, 29 pages, U.S. Appl. No. 11/735,596, filed Apr. 16, 2007.
Office Action dated May 24, 2011, 14 pages, U.S. Appl. No. 11/735,604, filed Apr. 16, 2007.
Krzyzanowski, P., "Clock Synchronization," Rutgers University-CS 417: Distributed Systems, 2000-2009, pp. 1-14.
National Instruments, "Introduction to Distributed Clock Synchronization and the IEEE 1588 Precision Time Protocol," http://zone.ni.com/devzone/cda/tut/p/id/2822, May 4, 2008, pp. 1-4.
Pratt, G., et al., "Distributed Synchronous Clocking," IEEE Transactions on Parallel and Distributed Systems, vol. 6, No. 3, Mar. 1995, pp. 314-328.
Wikipedia, "TTEthernet," http://en.wikipedia.org/wiki/TTEthernet, Retrieved on Dec. 22, 2011, pp. 1-3.
National Instruments, "Introduction to Distributed Clock Synchronization and the IEEE 1588 Precision Time Protocol," http://zone.ni.com/devzone/cda/tut/p/id/2822, May 14, 2008, pp. 1-4.
Office Action dated Mar. 6, 2012, 13 pages, U.S. Appl. No. 11/735,591, filed Apr. 16, 2007.
Office Action dated Aug. 3, 2011, 11 pages, U.S. Appl. No. 11/735,592, filed Apr. 16, 2007.
Office Action dated Jan. 23, 2012, 10 pages, U.S. Appl. No. 11/735,592, filed Apr. 16, 2007.
Precise Networked Clock Synchronization Working Group of the IM/ST Committee, IEEE P1588™ D2.2, "Draft Standard for a Precision Clock Synchronization Protocol for Networked Measurement and Control Systems," 2007, 305 pages, IEEE Standards Activities Department, Piscataway, NJ.
Office Action dated May 12, 2009, 15 pages, U.S. Appl. No. 11/737,800, filed Apr. 20, 2007.
Office Action dated Nov. 23, 2009, 19 pages, U.S. Appl. No. 11/737,800, filed Apr. 20, 2007.
Office Action dated Aug. 7, 2009, 10 pages, U.S. Appl. No. 11/735,590, filed Apr. 16, 2007.
Office Action dated Dec. 30, 2009, 22 pages, U.S. Appl. No. 11/735,590, filed Apr. 16, 2007.
Office Action dated Jun. 9, 2010, 13 pages, U.S. Appl. No. 11/735,590, filed Apr. 16, 2007.
Office Action dated Sep. 23, 2009, 10 pages, U.S. Appl. No. 11/735,591, filed Apr. 16, 2007.
Office Action dated Jan. 6, 2010, 19 pages, U.S. Appl. No. 11/735,591, filed Apr. 16, 2007.
Office Action dated Aug. 5, 2009, 21 pages, U.S. Appl. No. 11/739,316, filed Apr. 27, 2007.
Office Action dated Mar. 25, 2010, 22 pages, U.S. Appl. No. 11/739,316, filed Apr. 27, 2007.
Notice of Allowance dated Aug. 19, 2010, 16 pages, U.S. Appl. No. 11/739,316, filed Apr. 27, 2007.
Office Action dated Feb. 26, 2010, 22 pages, U.S. Appl. No. 11/971,386, filed Jan. 9, 2008.
Office Action dated Sep. 2, 2009, 13 pages, U.S. Appl. No. 11/735,592, filed Apr. 16, 2007.
Office Action dated Feb. 18, 2010, 22 pages, U.S. Appl. No. 11/735,592, filed Apr. 16, 2007.
Office Action dated Aug. 4, 2010, 9 pages, U.S. Appl. No. 11/735,592, filed Apr. 16, 2007.
Office Action dated Sep. 3, 2009, 15 pages, U.S. Appl. No. 11/735,596, filed Apr. 16, 2007.
Office Action dated Feb. 2, 2010, 23 pages, U.S. Appl. No. 11/735,596, filed Apr. 16, 2007.
Office Action dated Sep. 30, 2009, 9 pages, U.S. Appl. No. 11/735,598, filed Apr. 16, 2007.
Office Action dated Feb. 17, 2010, 23 pages, U.S. Appl. No. 11/735,598, filed Apr. 16, 2007.
Notice of Allowance dated Jun. 1, 2010, 8 pages, U.S. Appl. No. 11/735,598, filed Apr. 16, 2007.
Notice of Allowance dated Aug. 24, 2010, 14 pages, U.S. Appl. No. 11/735,598, filed Apr. 16, 2007.
Office Action dated Sep. 18, 2009, 13 pages, U.S. Appl. No. 11/735,602, filed Apr. 16, 2007.
Office Action dated Feb. 22, 2010, 21 pages, U.S. Appl. No. 11/735,602, filed Apr. 16, 2007.
Office Action dated Jul. 29, 2010 15 pages, U.S. Appl. No. 11/735,602, filed Apr. 16, 2007.
Office Action dated Sep. 15, 2009, 13 pages, U.S. Appl. No. 11/735,604, filed Apr. 16, 2007.
Office Action dated Feb. 17, 2010, 24 pages, U.S. Appl. No. 11/735,604, filed Apr. 16, 2007.
Office Action dated Jul. 29, 2010, 15 pages, U.S. Appl. No. 11/735,604, filed Apr. 16, 2007.
Office Action dated Oct. 29, 2009, 9 pages, U.S. Appl. No. 11/735,605.
Office Action dated Mar. 3, 2010, 20 pages, U.S. Appl. No. 11/735,605.
Notice of Allowance dated Jun. 21, 2012, 11 pages, U.S. Appl. No. 11/735,590, filed Apr. 16, 2007.
Office Action dated May 25, 2012, 15 pages, U.S. Appl. No. 11/737,800, filed Apr. 20, 2007.
Office Action dated Jun. 20, 2012, 44 pages, U.S. Appl. No. 13/271,691, filed Oct. 12, 2011.
Foreign Communication From a Related Counterpart Application-European Application No. 08700043.6, Supplementary European Search Report and Written Opinion dated Oct. 29, 2009, 7 pages.
Foreign Communication From a Related Counterpart Application-European Application No. 08700032.9, European Office Action dated Jun. 11, 2012, 10 pages.
Foreign Communication From a Related Counterpart Application, Chinese Application 2008800016093, Chinese Office Action dated Oct. 28, 2011, 4 pages.
Foreign Communication From a Related Counterpart Application, Chinese Application 2008800025092, Chinese Office Action dated May 19, 2011, 4 pages.
Fourcand, Serge Francois; U.S. Appl. No. 13/624,625; Title: "Inter-Packet Gap Network Clock Synchronization"; Filing Date: Sep. 21, 2012.
Fourcand, Serge F.; U.S. Appl. No. 13/649,820; Title: "System for TMD Data Transport Over Ethernet Interfaces"; Filing Date: Oct. 11, 2012.
Office Action dated Aug. 21, 2012, 17 pages, U.S. Appl. No. 11/737,800, filed Apr. 20, 2007.
Final Office Action dated Jan. 4, 2013, 27 pages, U.S. Appl. No. 13/271,691 filed Oct. 12, 2011.
Final Office Action dated Jan. 14, 2013, 15 pages, U.S. Appl. No. 11/735,596, filed Apr. 16, 2007.
Office Action dated Oct. 16, 2012, 40 pages, U.S. Appl. No. 12/862,521, filed Aug. 24, 2012.
Notice of Allowance dated Oct. 16, 2012, 42 pages U.S. Appl. No. 12/691,367, filed Jan. 21, 2010.
Office Action dated Feb. 1, 2013, 4 pages, U.S. Appl. No. 12/862,521, filed Aug. 24, 2010.
Foreign Communication From a Related Counterpart Application, Chinese Application 200880000770.9, Office Action dated Oct. 9, 2012, 5 pages.
Foreign Communication From a Related Counterpart application, Chinese application 200880000770.9, Partial English Translation Office Action dated Oct. 9, 2012, 5 pages.
Office Action dated Mar. 13, 2013, 27 pages, U.S. Appl. No. 11/737,800, filed Apr. 20, 2007.
Office Action dated Apr. 24, 2013, 43 pages, U.S. Appl. No. 13/162,803, filed Jun. 17, 2011.
Foreign Communication From a Related Counterpart Application, Chinese Application 200880000770.9, Chinese Office Action dated Mar. 19, 2013, 8 pages.

(56) References Cited

OTHER PUBLICATIONS

Foreign Communication From a Related Counterpart Application, Chinese Application 200880000770.9, Partial English Translation Office Action dated Mar. 19, 2013, 7 pages.

Notice of Allowance dated May 22, 2013, 18 pages, U.S. Appl. No. 11/735,592, filed Apr. 16, 2007.

Office Action dated Jun. 4, 2013, 6 pages, U.S. Appl. No. 13/162,803, filed Jun. 17, 2011.

Notice of Allowance dated Jul. 30, 2013, 9 pages, U.S. Appl. No. 11/737,800, filed Apr. 20, 2007.

Foreign Communication From a Counterpart Application, Chinese Application No. 200880000770.9, Chinese Office Action dated Jul. 26, 2013, 8 pages.

Foreign Communication From a Counterpart Application, Chinese Application No. 200880000770.9, Partial English Translation of Chinese Office Action dated Jul. 26, 2013, 9 pages.

Notice of Allowance dated Jun. 20, 2013, 40 pages, U.S. Appl. No. 13/271,691, filed on Oct. 12, 2011.

Office Action dated Aug. 2, 2013, 5 pages, U.S. Appl. No. 13/162,803, filed on Jun. 17, 2011.

Office Action dated Sep. 3, 2013, 6 pages, U.S. Appl. No. 11/737,800, filed on Apr. 20, 2007.

\* cited by examiner

CLOSED-LOOP CLOCK SYNCHRONIZATION

CROSS-REFERENCE TO RELATED APPLICATIONS

This application is a divisional of U.S. patent application Ser. No. 11/971,386 filed Jan. 9, 2008 by Serge F. Fourcand and entitled "Closed-Loop Clock Synchronization", which claims priority to U.S. Provisional Patent Application Ser. No. 60/886,833 filed Jan. 26, 2007 by Serge F. Fourcand and entitled "Closed Loop Clock Synchronization," both of which are incorporated herein by reference as if reproduced in its entirety.

This application is related to U.S. patent application Ser. No. 11/735,590 filed Apr. 16, 2007 entitled "Inter-Packet Gap Network Clock Synchronization," U.S. patent application Ser. No. 11/735,592 filed Apr. 16, 2007 entitled "Network Clock Synchronization Timestamp," U.S. patent application Ser. No. 11/735,596 filed Apr. 16, 2007 entitled "Multi-Frame Network Clock Synchronization," and U.S. patent application Ser. No. 11/735,598 filed Apr. 16, 2007 entitled "Network Clock Synchronization Floating Window and Window Delineation," all of which are by Serge F. Fourcand and are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Ethernet is the preferred protocol for many types of networks because it is flexible, decentralized, and scalable. Ethernet is flexible in that it allows variable-sized data packets to be transported across different types of mediums using various nodes each having different transmission speeds. Ethernet is decentralized in that it allows the end devices to transmit and receive data without oversight or intervention from a centralized server or party. Furthermore, Ethernet is scalable in that it can be implemented in both small-scale and large-scale networks. These advantages make Ethernet a preferred choice for data distribution in many computer networks.

Unfortunately, Ethernet does have some drawbacks. When Ethernet packets are transported through the network, the Ethernet packets contend with other traffic being transported over the same links or through the same nodes. The contentious traffic not only includes packets bound for the same destination, but also packets bound for other destinations that are transported over the same link or through the same node as the Ethernet packet. This contention produces burstiness and jitter at the nodes within the network. Some of these problems can be addressed by using resource arbitration and buffers at the nodes, and by prioritizing the packets into high-priority data and low-priority data. However, these solutions increase network complexity, increase delay, and detract from the inherent advantages of Ethernet.

The aforementioned drawbacks are part of the reason Ethernet has not been widely implemented in networks carrying high-priority data. Specifically, Ethernet does not provide a sufficient Quality of Service (QoS) to meet the stringent jitter and data loss requirements for streaming audio and video data. Instead, high-priority data is carried by highly synchronized networks, such as synchronous optical networks (SONET) and synchronous digital hierarchy (SDH) networks. Various Ethernet enhancements, such as circuit emulation, provider backbone transport, and pseudowires, have been proposed to address the jitter and data loss issues, but these enhancements fail to couple the flexibility of Ethernet with the high QoS requirements of high-priority data. Thus, a need exists for an improved Ethernet protocol that is flexible, easy to implement, and supports the QoS requirements of high-priority data.

SUMMARY

In one aspect, the disclosure includes a network comprising a destination node, and a plurality of source nodes configured to transmit high-priority data and low-priority data to the destination node, wherein the source nodes correlate the transmission of the high-priority data to the destination node such that the high-priority data from each source node does not substantially contend with the high-priority data from the other source nodes upon arrival at the destination node.

In another aspect, the disclosure includes a network component comprising at least one processor configured to implement a method comprising creating a periodic time window, partitioning the time window into low-priority time-bands and high-priority time-bands, placing a plurality of high-priority packets in the high-priority time-bands, and placing a plurality of low-priority packets in the low-priority time-bands.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems, methods, or both may be implemented using any number of techniques, whether currently known or in existence. The disclosure should in no way be limited to the illustrative implementations, drawings, and techniques illustrated below, including the examples of designs and implementations illustrated and described herein, but may be modified within the scope of the appended claims along with their full scope of equivalents.

Disclosed herein is a system and method for enhancing service delivery over packet switched networks using absolute time network synchronization and inter-node synchronous scheduling. Specifically, absolute time network synchronization and inter-node synchronous scheduling may be combined to coordinate the transport of packets to nodes within a network such that the packets arrive at each node in a staggered manner. Transporting packets in a staggered manner may substantially reduce or eliminate packet contention at the destination node. With reduced contention, packets may experience less jitter and hence less delay and data loss. The system and method may support the transport of current standard packet traffic, as well as emerging constant bit rate (CBR) traffic that may require higher QoS and have a lower tolerance for jitter and data loss. In a specific embodiment, the system and method may support the distribution of time division multiplexed (TDM) and fixed bandwidth traffic such as real-time audio and video applications over packet switched networks.

The nodes described herein may be any devices that forward packets to similar devices within a packet switched network. The nodes may be the originator or ultimate recipient of the packets or may merely forward received packets to other nodes. In some embodiments, the nodes may select paths for the individual packets to travel over the packet switched network. The nodes may have different properties, such as physical structure, capacity, transmission speed, and so forth. The nodes may be internal network devices such as routers, switches, or bridges, or the nodes may be user-oriented devices such as desktop computers, notebook computers, personal digital assistants (PDAs), or cellular telephones.

Figure 1:
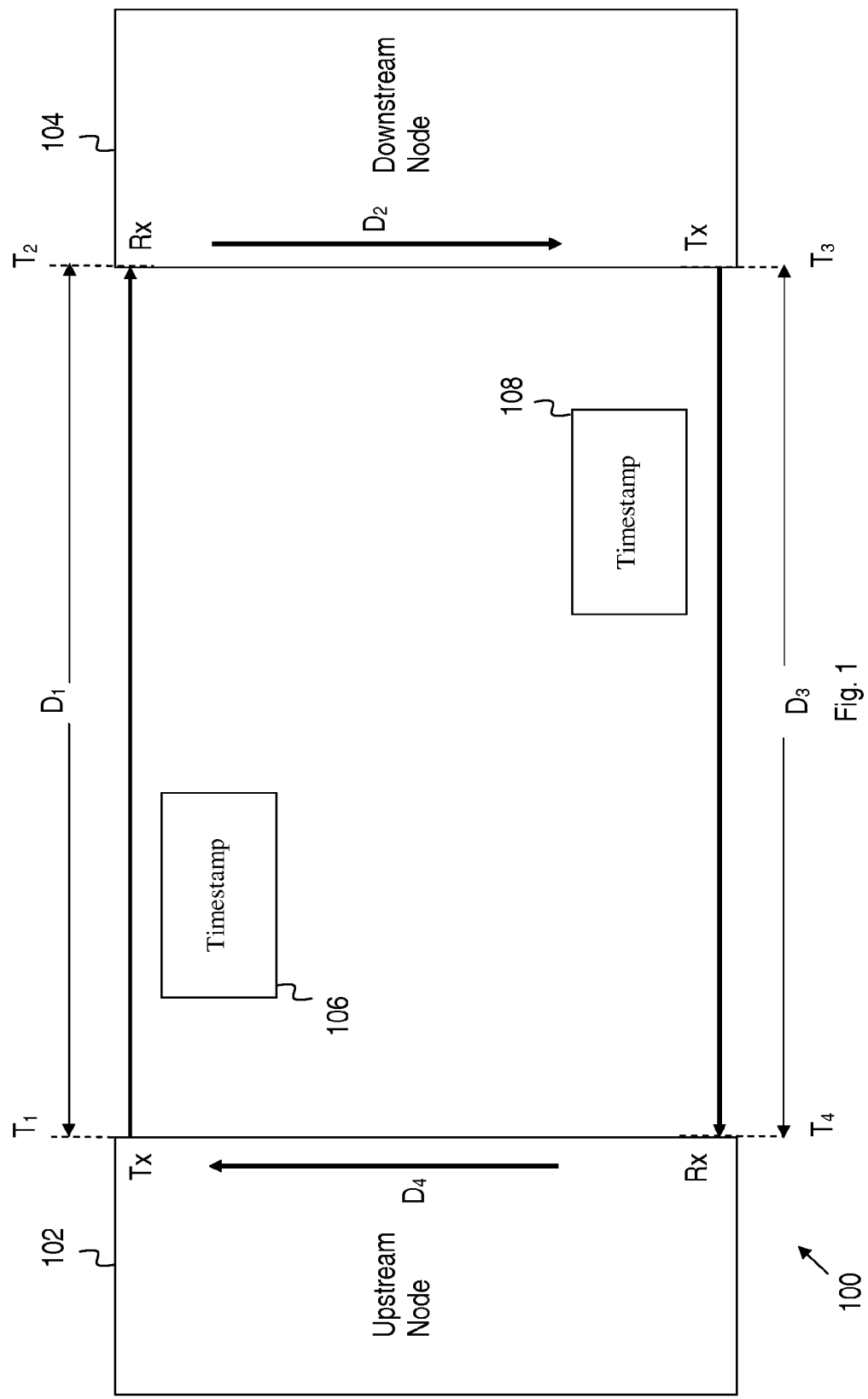
FIG. 1 is an illustration of an embodiment of a closed-loop clock synchronization method.

To support the enhanced service delivery described herein, at least some of the nodes within the network must be able to synchronize their clocks with the clocks in other nodes within the network, a process referred to herein as absolute time network synchronization. While any clock synchronization method may be used to achieve absolute time network synchronization between the nodes, FIG. 1 illustrates a diagram of a system 100 that utilizes a closed-loop clock synchronization scheme to achieve absolute time synchronization between a first node 102 and a second node 104. In the closed-loop clock synchronization scheme shown in FIG. 1, packet timestamps are used to achieve absolute time network synchronization between the first node 102 and the second node 104. Specifically, an upstream synchronization timestamp 106 may be created at the first node 102 and transmitted at time $T_1$ to the second node 104. Due to the transit time $D_1$ between the first node 102 and the second node 104, the upstream synchronization timestamp 106 may be received at time $T_2$ by the second node 104. The second node 104 may process the upstream synchronization timestamp 106 and create a downstream synchronization timestamp 108 that references the upstream synchronization timestamp 106. The processing at the second node 104 results in a delay $D_2$ between $T_2$ and $T_3$. The downstream synchronization timestamp 108 may then be transmitted back to the first node 102 in another packet at time $T_3$. Due to the transit time $D_3$ between the second node 104 and the first node 102, the downstream synchronization timestamp 108 may be received at time $T_4$ by the first node 102. The first node 102 may then compare the upstream synchronization timestamp 106 and the downstream synchronization timestamp 108 to determine the round-trip packet delay $D_4$.

In some embodiments, it may be assumed that there are symmetric upstream and downstream transit times between the first node 102 and the second node 104. In such a case, the upstream packet transit time $D_1$ may be substantially equal to the downstream packet transit time $D_3$. Consequently, the transit time $D_1$ may be calculated by subtracting the internal processing delay $D_2$ from the round-trip packet delay $D_4$, and dividing the difference by two. The internal processing delay $D_2$ may be determined by subtracting the time $T_2$ from the time $T_3$, and the timestamp round-trip delay may be determined by subtracting the time $T_1$ from the time $T_4$. Thus, the transit time $D_1$ may be estimated using equation 1:

$$D_1 = [(T_4 - T_1) - (T_3 - T_2)]/2 \qquad (1)$$

The transit time $D_1$ may be used to synchronize the second node's clock with the first node's clock. Specifically, the transit time $D_1$ and the first node's clock timing may be sent to the second node 104 so that the second node 104 can synchronize its clock with the first node's clock. Alternatively, the first node 102 may use the transit time $D_1$ and the downstream synchronization timestamp 108 to synchronize its clock with the second node's clock. The system 100 may recalculate the transit time $D_1$ and resynchronize the clocks over regular time intervals to improve the estimation of the transit time $D_1$. An embodiment of the closed-loop clock synchronization scheme shown in FIG. 1 is described in further detail in U.S. patent application Ser. No. 11/735,590 filed Apr. 16, 2007 by Serge F. Fourcand and entitled "Inter-Packet Gap Network Clock Synchronization," which is incorporated by reference herein as if reproduced in its entirety.

The above-described clock synchronization method is not the only method by which the nodes may achieve absolute time network synchronization. Specifically, absolute time network synchronization may be implemented between the first node 102 and the second node 104 using the methods described in Institute for Electrical and Electronic Engineers (IEEE) standard 1588. Alternatively, absolute time network synchronization may be implemented between the first node 102 and the second node 104 using any other absolute time synchronization scheme. Moreover, the concepts described herein may be repeated over a plurality of nodes such that three or more nodes are able to achieve absolute time network synchronization with each other. In an embodiment, some of the nodes in the group may implement one clock synchronization method while other nodes in the group may implement different clock synchronization methods to share the same absolute time.

Once the nodes share a common absolute time and are aware of the transit times between nodes, the nodes may coordinate the transport of packets within the network. Specifically, a plurality of source nodes may dispatch packets to a common destination node in a time-correlated manner such that the packets do not arrive simultaneously at the destination node, a process referred to herein as inter-node synchronous scheduling. Nodes that participate in inter-node synchronous scheduling are referred to herein as participating nodes. As part of the inter-node synchronous scheduling, the participating nodes communicate with each other or a third party and identify transmission time-bands for each node, data type, or both. By using the assigned time-bands and accounting for the transit time to the destination node, the participating nodes are able to coordinate the transport of packets to the destination node and substantially reduce or eliminate contention at the destination node.

Figure 2:
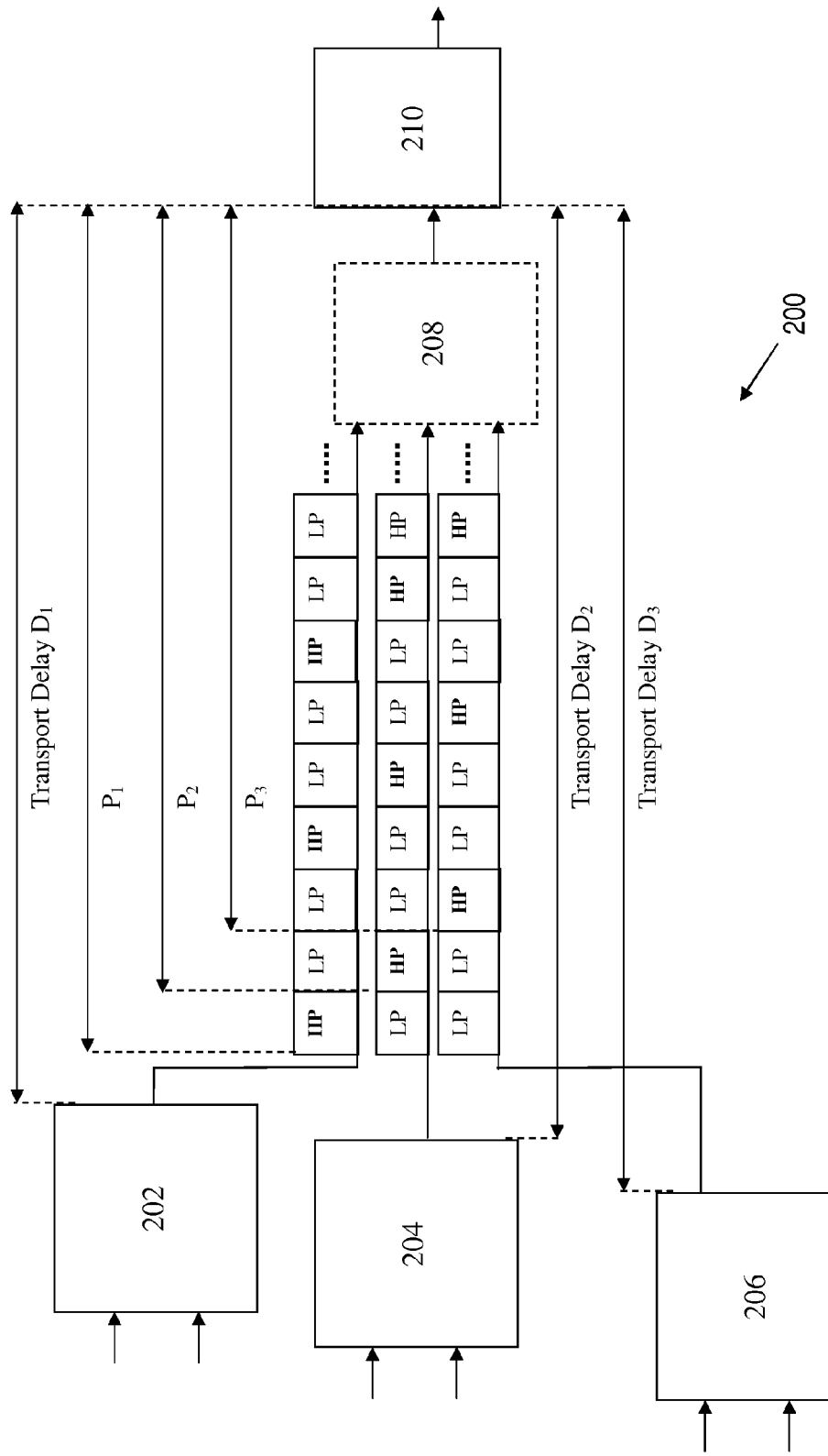
FIG. 2 is a schematic diagram of an embodiment of a packet switched network.

FIG. 2 illustrates one embodiment of a communication network 200 utilizing inter-node synchronous scheduling to coordinate the dispatch of packets from different source nodes to a common destination node. The network 200 may comprise nodes 202, 204, 206, and 210 that may support absolute time synchronization. As shown in FIG. 2, the transport delay between node 202 and node 210 is $D_1$, the transport delay between node 204 and node 210 is $D_2$, and the transport delay between node 206 and node 210 is $D_3$. Although the network 200 is shown to comprise four participating nodes and one non-participating node, the network 200 may comprise any number of participating and non-participating nodes.

The network 200 may also comprise a node 208 that may not support absolute time synchronization, referred to herein as a non-participating node. Without implementing absolute time synchronization, the transit time between each of the three source nodes 202, 204, and 206 and the non-participating node 208 may not be estimated. Hence, no direct inter-node synchronous scheduling may be implemented for packets transmitted from the three source nodes 202, 204, and 206 when the non-participating node 208 is the destination node. However, when there is a single path between the non-participating node 208 and the destination node, packets may arrive at the destination node 210 in the same order that they arrive at the non-participating node 208. The non-participating node 208 need not be connected to all of the source nodes 202, 204, 206 so long as any delay in the non-participating nodes is accounted for in the inter-node synchronous scheduling. Thus, packets that are dispatched from the three source nodes 202, 204, and 206 to the destination node 210 may arrive at the non-participating node 208 in a staggered manner, and thus may undergo minimal contention at the non-participating node 208.

Nodes 202, 204, 206 may send packets with various priority levels to node 210. As an example, these packets may be classified as high-priority packets (HPPs) and low-priority or best effort packets (BEPs). Additional priority levels may be used. The priority levels of the packets may be determined based on the QoS requirements of the data within the packet or some service level agreement (SLA) associated with the packet. Specifically, HPPs may comprise data with high QoS requirements, such as TDM data or streaming audio/video data. In contrast, BEPs may comprise services with low or no QoS requirements, such as Internet Protocol (IP) packets used for web browsers and email packets.

As shown in FIG. 2, the nodes 202, 204, 206 may each be assigned a series of time-bands for the different priority levels of traffic. Specifically, the nodes 202, 204, 206 may each be assigned time-bands for transmitting HPPs to the destination node 210, designated as HP in FIG. 2. The nodes 202, 204, 206 may also be assigned time-bands for transmitting BEPs to the destination node 210, designated as LP in FIG. 2. Each of the source nodes 202, 204, and 206 may dispatch their HPPs and BEPs to the destination node 210 using the HP and LP time-bands, respectively. The inter-node synchronous scheduling may rely on the absolute time network synchronization between the nodes 202, 204, 206, 210 to coordinate packet dispatch from different source nodes 202, 204, 206 to the common destination node 210. In addition, the nodes 202, 204, 206 may dispatch their packets such that the HP time-bands do not overlap or have a substantially reduced overlap, whereas the LP time-bands may overlap. Specifically, node 202 uses time offset $P_1$, node 204 uses time offset $P_2$, and node 206 uses time offset $P_3$ to adjust their transmissions to align each of the HPPs such that they do not contend with each other upon arrival at the non-participating node 208 or the destination node 210. This arrangement is shown by the offset alignment of HP time-bands from nodes 202, 204, 206. Hence, packet contention over the shared resources of the destination node, for example a common memory buffer, may be substantially reduced or eliminated. As used herein, the term contention refers to the simultaneous arrival of HPPs from a plurality of source nodes at a common port at destination node. In an embodiment, a scheduler within the source nodes manages the transmission of the data streams within the time-bands using the time offsets.

The inter-node synchronous scheduling described herein may be modified to suit many different situations. For example, varying the quantity and sizes of the HP and LP time-bands within a periodic window may control the high-priority and low-priority traffic bandwidths in the network 200. In some instances, two or more distinct data flows of the same priority level but with different bandwidth sizes may be dispatched from the same source node. Within each flow, the packets may have different sizes. Alternatively, three or more priority levels may be considered, wherein three or more types of time-bands may be assigned to the priority levels. Packets with three or more priority levels may be dispatched from a source node over their assigned time-bands in a similar manner to the two-priority level.

Although the inter-node synchronous scheduling provides a framework for transporting HPPs from a plurality of source nodes to a single destination node without substantial contention at the source node, there may be a need for variations of the framework. Specifically, because packets can be different sizes, received at infrequent intervals, or both, the time-bands may not be filled or the packets may overrun the time-bands. Described below are three operational modes for addressing such circumstances, termed the Huawei Enhanced Provider Backbone Bridged (HE-PBB)-1 operational mode, the HE-PBB-2 operational mode, and the HE-PBB-3 operational mode.

Figure 3:
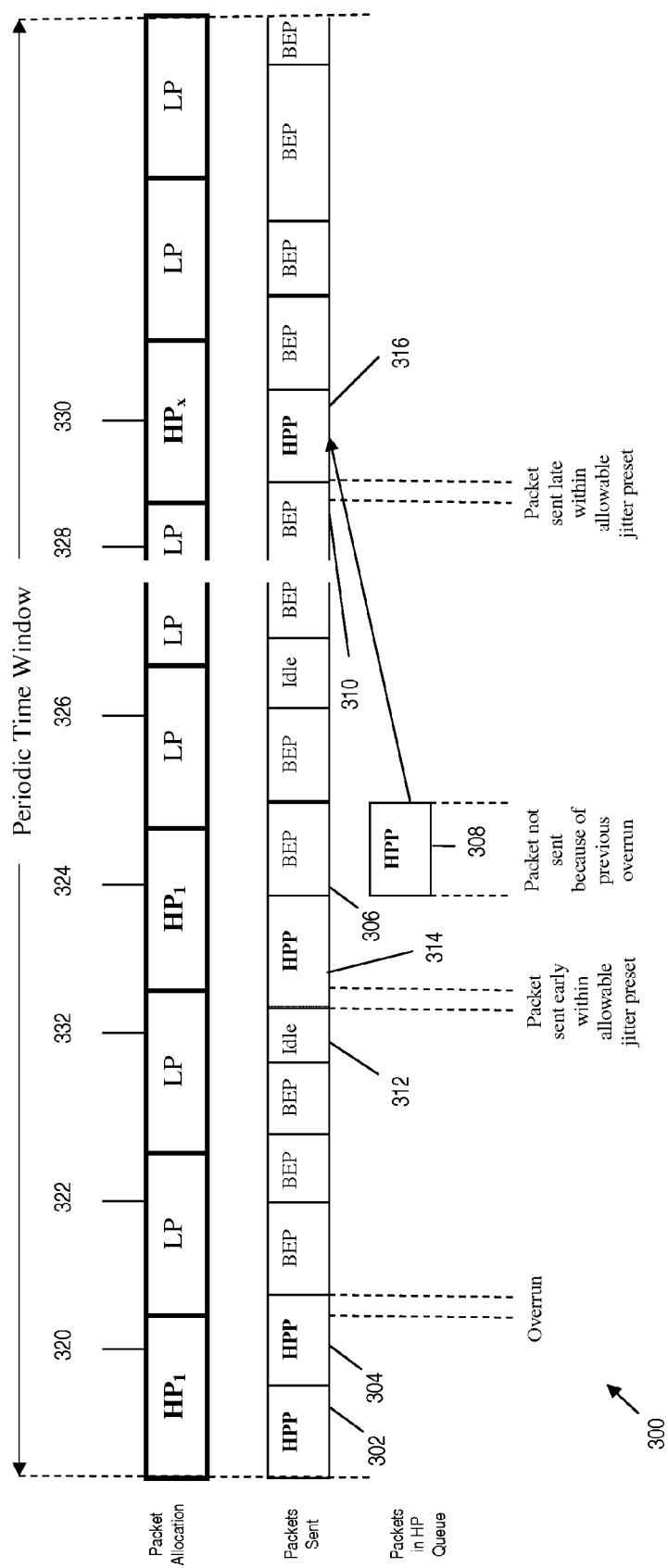
FIG. 3 is an illustration of an embodiment of a method for enhancing packet delivery.

FIG. 3 is an illustration of one embodiment of a system 300 implementing the HE-PBB-1 operational mode. The system 300 implements a periodic, reoccurring window between each source node and each destination node. The window may have any duration, such as 125 microseconds (μs). Within the window, several different time-bands may be defined, such as the aforementioned HP and LP time-bands. As described above, the HP time-bands between a source node and a destination node may not substantially overlap with HP time-bands assigned between other source nodes and the same destination node. The system 300 may associate all of the HP time-bands within a single periodic window to a single HPP flow. However, the source node may process more than one stream of HPP, and may send more than one stream of HPP to a single destination node. As such, the source node may associate the HP time-bands within a periodic window with a plurality of HPP flows, designated as $HP_1 \ldots HP_x$ in FIG. 3. In such a case, the individual HP time-bands may be used to differentiate the HPP flows, or the HPP flows may be differentiated based on information within the packets' headers. In addition, the size and quantity of HP time-bands associated with each HPP flow may be varied to define a desired amount of bandwidth from the source node to the destination node.

As mentioned above, the periodic window may also contain one or more LP time-bands. In contrast with the HP time-bands, the LP time-bands between a source node and a destination node are assigned without regard to the LP time-bands between other source nodes and the destination node. Consequently, the LP time-bands between a source node and a destination node may overlap with LP time-bands assigned between other source nodes and the same destination node. BEPs are generally processed individually, and thus are not generally associated with a particular flow. However, if it is desired to associate BEPs with a BEP flow, then the source node may associate the LP time-bands within a periodic window with one or more BEP flows. As with the HP time-bands, the individual LP time-bands may be used to differentiate the BEP flows, or the BEP flows may be differentiated based on information within the packets' headers. In addition, the size and quantity of LP time-bands associated with each BEP flow may be varied to define a desired amount of bandwidth from the source node to the destination node. In addition, the LP time-bands may simply be any time-bands not designated as HP time-bands, or the LP time-bands may be a separate designation such that the periodic window may contain HP, LP, and idle time-bands.

In some instances, an HPP may exceed the length of its assigned HP time-band. Specifically, due to the variable size of the packets, the dispatch of a single packet may exceed a single time-band to which the packet was assigned. For example and with reference to FIG. 3, the source node may dispatch two consecutive HPPs 302, 304, both corresponding to HP time-band 320. However, HP time-band 320 may not be large enough to accommodate the two consecutive HPPs 302, 304, and thus HPP 304 overruns HP time-band 320 and encroaches some of the adjacent LP time-band 322. The system 300 may allow HPP 304 to encroach some of LP time-band 322 in such instances. Such may be preferable because: HPPs have a higher priority level than BEPs, it may be undesirable to break up HPP 304, dispatching the HPPs without tolerating some HPP encroachment over LP time-bands may cause intolerable delivery delays in HPPs, or combinations thereof. The encroaching HPP flow may cause delays in BEP delivery to the destination node. However, such BEP delivery delay may be tolerated to ensure no or minimal delivery delays of HPPs and because BEPs have a low-priority level. After dispatch of the HPP is concluded, the source node may begin dispatching the packets associated with the LP time-band 322.

In an embodiment, the source node may balance the HPP encroachment into LP time-bands by allowing the BEPs to encroach on the HP time-bands. Specifically, the overrun of HPPs into LP time-bands gives the HPP flow more bandwidth than is allocated in the HP time-bands. The extent of the additional bandwidth may be tracked, for example, by the source node or another network component by keeping a running total of the length of each overrun. When such overruns reach a certain point, such as the size of a BEP, the source node may compensate for such overruns by allowing a BEP to replace an HPP in an HP time-band. For example and with reference to FIG. 3, HPP 308 would normally be sent in HP time-band 324. However, BEP 306 can replace HPP 308 to compensate for previous or anticipated HPP overruns. The BEP 306 may be dispatched wholly within the HP time-band 324, or may overrun into the adjacent LP time-band 326. When multiple HP time-bands associated with different HPP flows are present, the HPP flows' overruns may be tracked as a group, or each HPP flow may be tracked individually and BEP replacement of HPPs allocated on a flow-by flow basis. In any event, the encroachment of the BEP in the HP time-band is tracked and deducted from the running total of HPP overrun.

In an embodiment, the different HP time-bands are separated by LP time-bands. When two HP time-bands associated with the same HPP flow are adjacent to one another and the HPPs exceed the first HP time-band, the encroachment of the HPPs on the second time-band has no effect on the bandwidth allocated to the HPP flow. However, when two HP time-bands associated with different HPP flows are adjacent to one another and the first HPP flow exceeds the first HP time-band, the first HPP flow encroaches on the bandwidth of the second HPP flow and jitter may occur. When such encroachment persists, the bandwidth of the second HP time-band may suffer, and may eventually cause packet losses due to memory queue overflow. Therefore, it may be necessary to separate different HP time-bands by one or more LP time-bands, keeping in mind that additional LP time-bands within the periodic window reduce the link utilization in terms of HPP transmission bandwidth.

In some instances, a BEP may exceed the length of its assigned LP time-band. For example and with reference to FIG. 3, the source node may dispatch BEP 310 corresponding to LP time-band 328. However, LP time-band 328 may not be large enough to accommodate the BEP 310, and thus BEP 310 overruns LP time-band 328 and encroaches some of the adjacent HP time-band 330. Alternatively, the HPP 316 may be sent late due to jitter. The system 300 may allow BEP 310 to encroach some of HP time-band 330 in such instances. Such may be preferable because it may be undesirable to break up BEP 310, but the encroaching BEP flow may cause delays in HPP delivery to the destination node. As such, the BEP overruns may be tracked and corrected in a manner similar to that described above for HPP overruns. After dispatch of the BEP is concluded, the source node may begin dispatching the packets associated with the HP time-band 330.

In some instances, there may be idle periods when there are not any BEP or HPP to dispatch. Such instances occur, for example, when there is an inter-packet gap (IPG). In such instances, the source node may dispatch either an HPP or a BEP whenever it is ready and without regards to the classification of the time-band as HP or LP. For example and with reference to FIG. 3, an IPG 312 occurs in LP 332 and the source node is subsequently ready to dispatch HPP 314. In such a case, HPP 314 may be dispatched prior to the beginning of HP time-band 324. Thus, some HPPs may occupy the end portion of a LP time-band that precedes the assigned HP time-band, a condition referred to as an underrun. A similar situation may exist when BEPs underrun their LP time-band and encroach an HP time-band during an idle period. In either case, the underruns may be tracked and corrected as described above. The described underruns and overruns may improve link bandwidth utilization while keeping packet delays and jitter at a minimum. In an embodiment, the length of the overruns and underruns described herein correlate to the jitter allowed within the system 300.

Figure 4:
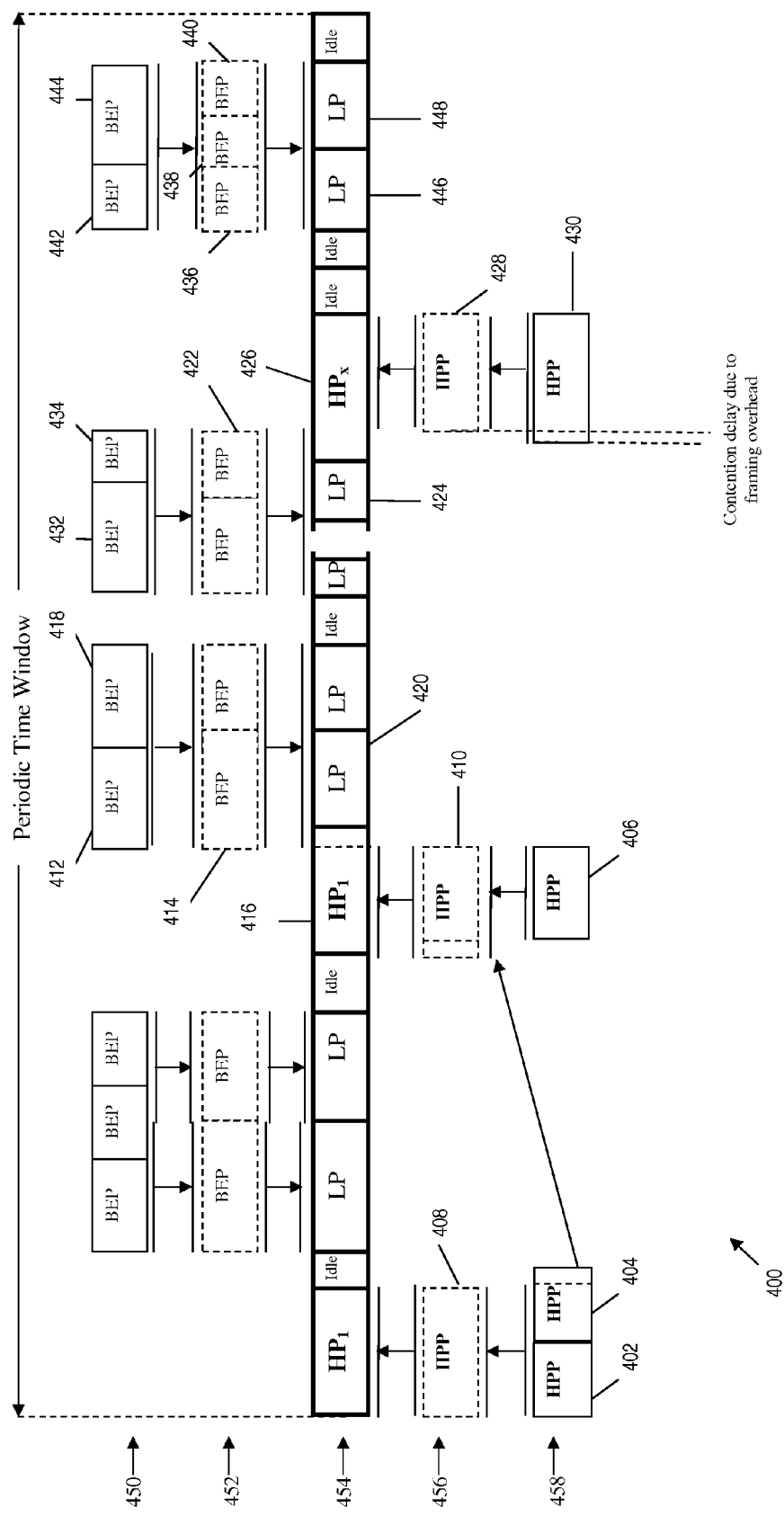
FIG. 4 is an illustration of another embodiment of a method for enhancing packet delivery.

FIG. 4 is an illustration of one embodiment of a system 400 implementing the HE-PBB-2 operational mode. As with the HE-PBB-1 operational mode, the system 400 may use absolute time synchronization and inter-node synchronous scheduling between a participating source node and a participating destination node. The system 400 may also implement a periodic, reoccurring window between each source node and each destination node, and several different priority level time-bands may be defined within the window. The properties of the periodic window and the time-bands are substantially the same as described above. However, unlike the HE-PBB-1 operational mode, the HE-PBB-2 operational mode truncates and encapsulates some of the packets to make the packets fit within the time-bands.

FIG. 4 illustrates the truncation and encapsulation that occurs within the source node. Specifically, the top and bottom rows of FIG. 4 illustrate an incoming stream of BEPs 450 and HPPs 458, respectively. The BEPs 450 and HPPs 458 are arranged in the temporal order that they are received at the source node such that BEPs 450 and HPPs 458 on the left side of FIG. 4 are received before BEPs 450 and HPPs 458 on the right side of FIG. 4. As explained below, the BEPs 450 are truncated and encapsulated into a modified BEP stream 452. Similarly, the HPPs 458 are truncated and encapsulated into a modified HPP stream 456. The arrangement of the HP, LP, and idle time-bands within the periodic time window is shown in the packet allocation 454. After each packet in the modified BEP stream 452 and the modified HPP stream 456 is created, it is added to the packet allocation 454 in the appropriate time-band, e.g. modified BEPs 452 in LP time-bands and modified HPPs 456 in HP time-bands. Thus, the packet allocation 454 represents the outgoing data stream. The process illustrated in FIG. 4 may be implemented in reverse at the destination node to unencapsulate and recombine the packet allocation 454 into the original BEPs 450 and HPPs 458.

The truncation and encapsulation of the BEPs 450 and HPPs 458 is substantially the same, and can be illustrated using HPPs 402, 404, 406 and modified HPPs 408 and 410. As HPPs 402, 404 are received by the source node, they are encapsulated within the modified HPP 408. Specifically, a new header is created for modified HPP 408 using a standard header, such as the Layer 2 framing used in Ethernet networks. In addition, the modified HPP 408 may use a standard packet size, which may be any acceptable packet size, including standard Ethernet frame sizes and jumbo Ethernet frame sizes. The standard header and packet size allows the modified HPPs 456 and modified BEPs 452 to be tunneled, routed, and otherwise processed by non-participating nodes. In addition, it would be desirable to optimize the size of the HP time-bands, LP time-bands, the modified BEPs 452 and the modified HPPs 456 such that the time-bands match the correlating modified packets to minimize the overhead due to the required second level of framing. However, this may have to be balanced with the requirements for bandwidth granularity and the desired number of time-bands that have to be supported.

After the standard header is created, the HPPs 402, 404 are added to the data section of the modified HPP 408 until the data section is filled such that the modified HPP 408 has a standard packet size. As shown in FIG. 4, then an entire HPP 404 may not be able to fit into a single modified HPP 408. As such, the HPP 404 is truncated such that the first portion of HPP 404, e.g. the portion to the left of the dashed line, is added to the modified HPP 408. The remaining portion of the HPP 404, e.g. the portion to the right of the dashed line, is buffered in a memory and later combined with HPP 406 in modified HPP 410. If desired, special control characters may be placed within the modified HPP 408 to delineate one HPP 458 from another, e.g. HPP 402 from HPP 404. In addition, special control characters may be placed within the modified HPPs 456 to indicate the continuation of a previous HPP 458, e.g. the second portion of HPP 404 in modified HPP 410, if desired. The truncation and encapsulation described herein may be preferable because the modified HPPs 456 and modified BEPs 452 may be substantially the same size as the time-bands in the packet allocation 454.

In some embodiments, there may be instances when only one of the BEP stream and the HPP stream is being received by the source node during a non-corresponding time-band. For example, BEP 412 may be received at a time corresponding to the HP time-band 416, but no HPPs 458 are being received or buffered for subsequent encapsulation. In such a case, it is not desirable to buffer the BEP 412 and let the packet allocation 454 go idle. As such, when only one packet stream is being received during a non-corresponding time-band, that packet stream may be placed into the non-corresponding time-band for transmission to the destination node. Specifically, BEP 412 and the first part of BEP 418 can be encapsulated into modified BEP 414, which is then placed into the unused portion of HP time-band 416, e.g. the portion to the right of the dashed line, and LP time-band 420. If desired, a special control character may be used to indicate the presence of the modified BEP 452 in the HP time-band 416. It will be appreciated that this embodiment may also be implemented at the beginning of a non-corresponding time-band. In addition, the present embodiment may also be used for placing modified HPPs 456 into LP time-bands. Placing a packet stream into a non-corresponding time-band may be preferable because it may increase the utilization of the link between the source node and the destination node.

In some embodiments, BEPs 450 and HPPs 458 may be received alternatively in a limited overlapping manner. For example, BEPs 432, 434 are received and followed by HPP 430. As shown in FIG. 4, there may be some overlap between BEP 434 and HPP 430. As such, BEP 434 would normally contend with HPP 430, and would have to be truncated because HPP 430 has the rights to HP time-band 426. However, some delay may be incurred in encapsulating HPP 430 within modified HPP 428. As such, modified BEP 422 may be placed in LP time-band 424 and the first portion of HP time-band 426 until modified HPP 428 is complete. Upon the completed encapsulation of modified HPP 428, the modified BEP 422 is placed in the second portion of HP time-band 426. Thus, even though there was some initial contention between BEP 434 and HPP 430, the contention was resolved during the encapsulation and placement of modified BEP 422 and modified HPP 428 into HP time-band 426. This contention delay may correspond to the jitter allowed within the system 400. It will be appreciated that BEP 434 may be truncated such that the modified BEP 422 does not contend with the modified HPP 428 for the HP time-band 426. It will also be appreciated that this embodiment may occur in the reverse order such that a modified BEP is subsequent to a modified HPP. Finally, the present embodiment is also applicable to HPPs 458 contending with BEPs 450 for LP time-bands.

In some embodiments, a plurality of similar time-bands may be adjacent to one another. For example, LP time-bands 446 and 448 are adjacent to one another in FIG. 4. In such cases, it may not be necessary for the modified BEPs 452 or modified HPPs 456 to be sized such that they align with the time-bands. Specifically, because LP time-bands 446 and 448 are assigned to carry the same data type, modified BEPs 436, 438, and 440 may be placed in LP time-bands 446 and 448. Alternatively, BEPs 442 and 444 could be placed in LP time-bands 446 and 448, if desired.

Figure 5:
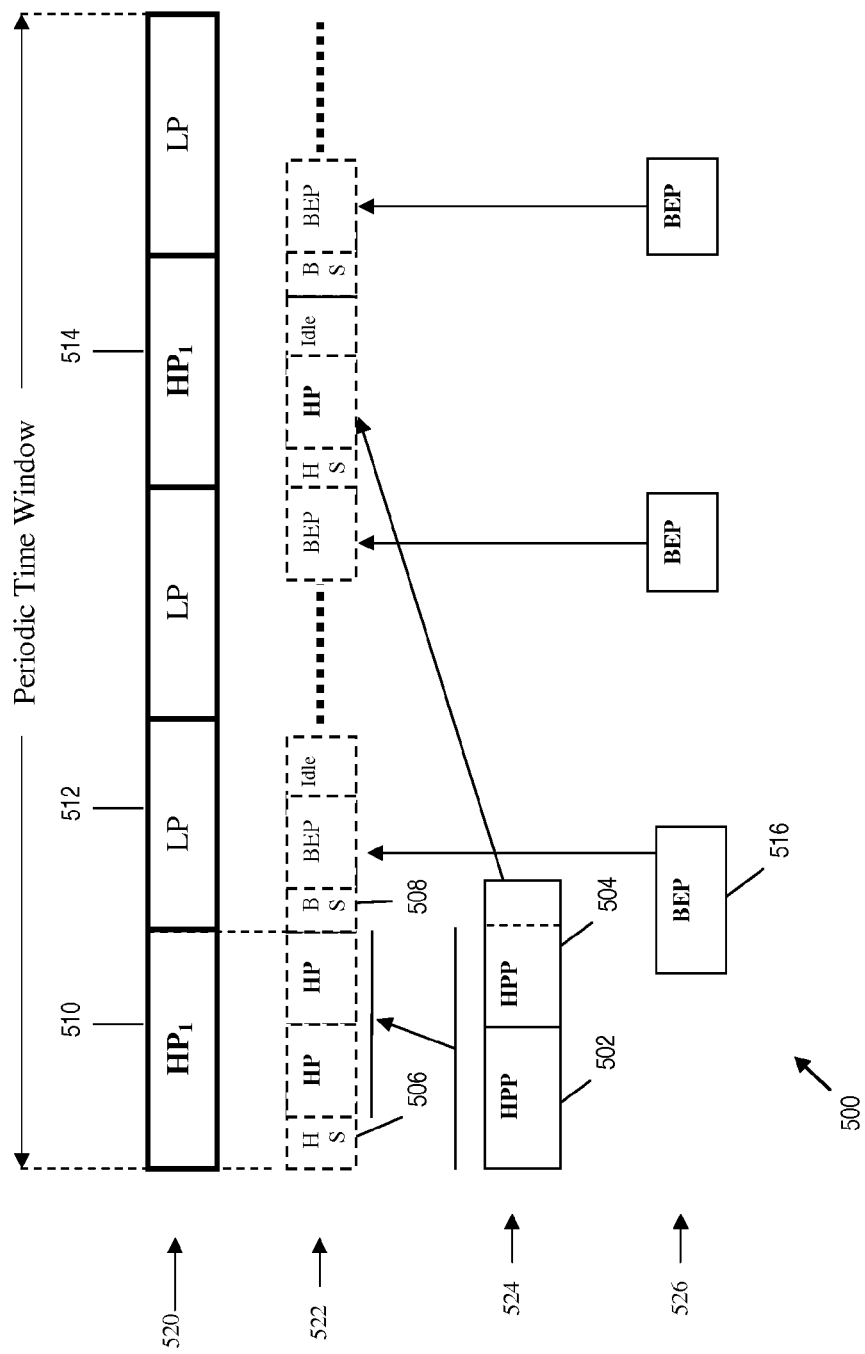
FIG. 5 is an illustration of another embodiment of a method for enhancing packet delivery.

FIG. 5 is an illustration of one embodiment of a system 500 implementing the HE-PBB-3 operational mode. As with the previous operational modes, the system 500 may use absolute time synchronization and inter-node synchronous scheduling between a participating source node and a participating destination node. The system 500 may also implement a periodic, reoccurring window between each source node and each destination node, and several different priority level time-bands may be defined within the window. The properties of the periodic window and the time-bands are substantially the same as described above. However, unlike the other operational modes, the HE-PBB-3 operation mode uses a special control character to delineate the transition between packet types, e.g. BEP and HPP, and truncates the packets at the end of the corresponding time-band, e.g. HP or LP.

FIG. 5 illustrates the delineation and truncation that occurs within the source node. Specifically, the bottom two rows of FIG. 5 illustrate incoming streams of HPPs 524 and BEPs 526. The HPPs 524 and BEPs 526 are arranged in the temporal order that they are received at the source node such that HPPs 524 and BEPs 526 on the left side of FIG. 5 are received before HPPs 524 and BEPs 526 on the right side of FIG. 5. As explained below, the HPPs 524 and BEPs 526 are truncated and fit into a modified packet stream 522. The arrangement of the HP, LP, and idle time-bands within the periodic time window is shown in the packet allocation 520. After the HPPs 524 and BEPs 526 are fit into the modified packet stream 522, the modified packet stream 522 is added to the packet allocation 520. Thus, the packet allocation 520 represents the outgoing data stream. The process illustrated in FIG. 5 may be implemented in reverse at the destination node to reconstruct the original HPPs 524 and BEPs 526.

In the system 500, the beginning of each packet type is indicated by a special control character. Specifically, an HPP start character 506 is placed in the modified packet stream 522 before HPPs 502 and 504. Using the special Ethernet control symbol, the system 500 may be utilized to enforce SLAs, wherein the levels of service availability are specified. Using the special Ethernet control symbols to truncate the HPPs may also allow the use of contiguous HP time-bands while minimizing contention between HPPs at the participating nodes. The alignment of the HPP start character 506 and the HPPs 502, 504 in the modified packet stream 522 corresponds to the size and location of the HP time-band 510. Any BEPs 526 received during the HP time-bands are buffered until the next LP time-band 512. As such, HPP 504 is truncated at the end of HP time-band 510, buffered, and inserted into the modified packet stream 522 at the next HP time-band 514. When LP time-band 512 begins, a BEP start character 508 is inserted into the modified packet stream 522 and is followed by BEP 516. It will be appreciated that the BEPs 526 may be truncated in a similar manner as the HPPs 524.

The HE-PBB-3 operational mode may be advantageous for many reasons. For example, the HE-PBB-3 operational mode may prevent HPPs from encroaching on LP time-bands and BEPs from encroaching on HP time-bands. Since there are no encroachment issues, the packets are the same size as their corresponding time-bands minus the special Ethernet control symbol overhead, and hence optimal bandwidth utilization for HPPs may be achieved. The special Ethernet control symbol may also minimize BEP-to-HPP transition overhead. Because of reduced overhead during transitions between HPPs and BEPs, the system 500 may reduce the size of time-bands in the periodic time window without significant bandwidth loss. Reducing the size of time-bands in the periodic time window may further improve bandwidth granularity and enable the support of a larger number of time-bands. By supporting a larger number of time-bands within the periodic time window, the system 500 may support a larger number of logical data flows through the network.

Unlike the HE-PBB-1 and HE-PBB-2 operational modes, the HE-PBB-3 operational mode may not support the transition of the truncated HPPs and BEPs through non-participating nodes in the network. The non-participating nodes may not recognize the non-standard special Ethernet control symbols that are used in the truncated frames. For that reason, forwarding and terminating the truncated HPPs and BEPs may be done by the participating nodes of the system 500 that recognize the special Ethernet control symbols. The truncated frames may be forwarded using equipments compatible with standard Layer 1 Ethernet frames. The use of the special Ethernet control symbols may be sufficient for enhancing packet distribution and delivery with no further encapsulation, which may improve links utilization without the need for a Layer 2 Ethernet framing.

In comparison to the HE-PBB-1 and HE-PBB-2 operational modes, the HE-PBB-3 operational mode may involve less complexity in the decision logic required to handle the wide range of Ethernet packet sizes. In one embodiment, the system 500 may utilize the closed-loop clock synchronization method described above for absolute time synchronization, which may require a full-duplex mode of implementation. The full-duplex mode of implementation may also be utilized by the system 500 for preamble or header suppression to increase the available link bandwidth.

Figure 6:
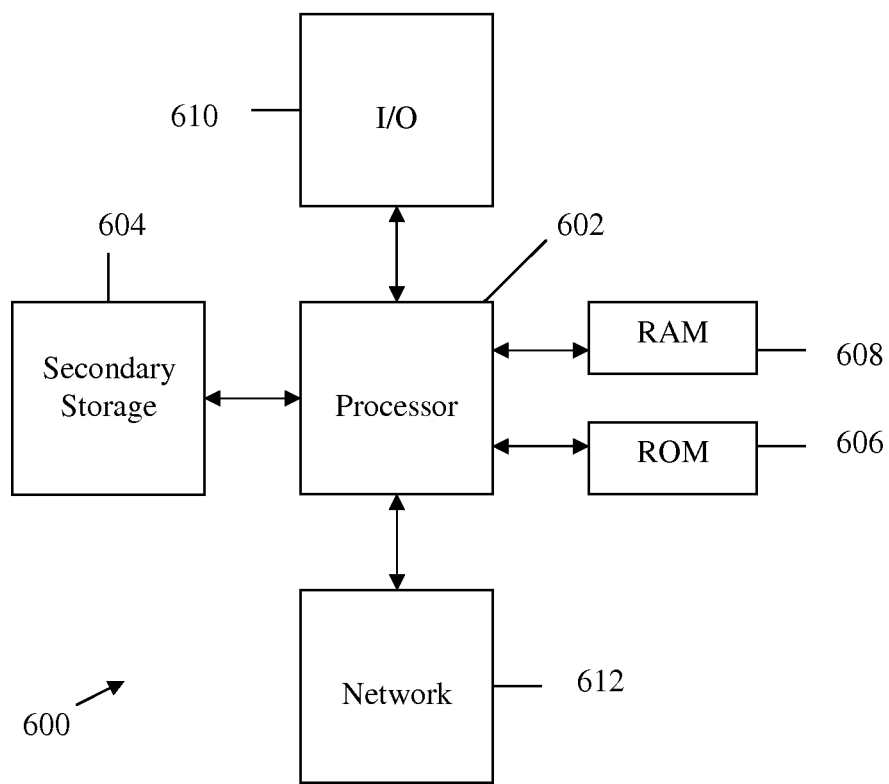
FIG. 6 is an illustration of one embodiment of a general-purpose computer system.

The network described above may be implemented on any general-purpose network component, such as a computer or network component with sufficient processing power, memory resources, and network throughput capability to handle the necessary workload placed upon it. FIG. 6 illustrates a typical, general-purpose network component suitable for implementing one or more embodiments of a node disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage. The RAM 608 is used to store volatile data and perhaps to store instructions. Access to both ROM 606 and RAM 608 is typically faster than to secondary storage 604.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   a processor configured to:
      determine aperiodic transmission window to transmit data;
      partition the periodic transmission window into a plurality of low-priority time-bands and a plurality of high-priority time-bands;
      receive a plurality of high-priority packets and a plurality low-priority packets;

truncate at least one of the high-priority packets and one of the low-priority packets;
encapsulate the high-priority packets and the low-priority packets; and
an output device coupled to the processor, wherein the output device is configured to:
transmit a remainder of the truncated high-priority packet in a subsequent high-priority time-bands;
transmit a remainder of the truncated low-priority packet in a subsequent low-priority time-bands;
transmit the encapsulated high-priority packets during the high-priority time-bands; and
transmit the encapsulated low-priority packets during the low-priority time-bands,
wherein the high-priority time bands represent assigned time intervals within the periodic transmission window designated for the transmission of the encapsulated high-priority packets,
wherein at least some of the low-priority packets and some of the high-priority packets are received simultaneously, and
wherein the transmission for the encapsulated low-priority packets and the encapsulated high-priority packets do not overlap.

2. The network component of claim 1, wherein some of the high-priority packets and some of the low-priority packets are not truncated, and wherein the low-priority time bands represent assigned time intervals within the periodic transmission window designated for the transmission of the low-priority packets.

3. The network component of claim 1, wherein the high-priority packets belong to a plurality of high-priority flows, and wherein there is at least one high-priority time-band for each high-priority flow.

4. The network component of claim 1, wherein the processor is further configured to:
fill some of the high-priority time-bands with encapsulated low-priority packets when there are not any encapsulated high-priority packets to place in the high-priority time-bands; and
fill some of the low-priority time-bands with encapsulated high-priority packets when there are not any encapsulated low-priority packets to place in the low-priority time-bands.

5. The network component of claim 1, wherein the processor is further configured to:
delineate the start of the high-priority packets with a control symbol; and
delineate the start of the low-priority packets with another control symbol.

6. The network component of claim 1, wherein the output device is further configured to transmit part of the truncated high-priority packet within a first high-priority time-band.

7. The network component of claim 6, wherein the remainder of the truncated high-priority packet is not transmitted within the first high-priority time-band.

8. The network component of claim 1, wherein an offset is used to align the high-priority time-bands with a second set of high-priority time-bands.

9. The network component of claim 8, wherein the second set of high-priority time-bands are used by a different source node to transmit a second set of high-priority packets, and wherein the high-priority time-bands and the second set of high-priority time-bands do not overlap within the periodic transmission window.

10. The network component of claim 1, wherein a first high-priority packet is assigned to a first high-priority time-band, wherein some of the first high-priority packet is transmitted within the first high-priority time-band, and wherein some of the first high-priority packet is transmitted within a first low-priority time-band immediately following the first high-priority time-band.

11. The network component of claim 1, wherein a first encapsulated low-priority packet is transmitted within a first high-priority time-band during encapsulation of a first high-priority packet that is assigned to the first high-priority time-band.

12. A method for coordinating the dispatch of data from one or more source nodes to a common destination node, wherein the method comprises:
establishing a periodic time window; and
receiving a first data stream that comprises a plurality of first high-priority packets and a plurality of first low-priority packets within the periodic time window,
wherein the first high-priority packets are received within a plurality of first high-priority time-bands for the first data stream,
wherein the first low-priority packets are received within a plurality of first low-priority time-bands for the first data stream,
wherein the first high-priority time-bands represent assigned time intervals within the periodic time window designated for the transmission of the first high-priority packets,
wherein the first low-priority time-bands represent assigned time intervals within the periodic time window designated for the transmission of the first low-priority packets,
wherein at least one of the high-priority packets and one of the low-priority packets are truncated within the data stream,
wherein a remainder of the truncated high-priority packet is placed in a subsequent first high-priority time-bands,
wherein a remainder of the truncated low-priority packet is placed in a subsequent first low-priority time-bands,
wherein the first high-priority packets and the first low-priority packets are encapsulated within the data stream,
wherein some of the first low-priority packets and some of the first high-priority packets are received simultaneously by one of the source nodes, and
wherein the first low-priority packets and the first high-priority packets do not overlap within the data stream.

13. The method of claim 12 further comprising receiving a second data stream that comprises a plurality of second high-priority packets and a plurality of second low-priority packets, wherein the second high-priority packets are received within a plurality of second high-priority time-bands for the second data stream, wherein the second high-priority time-bands represent assigned time intervals within the periodic time window designated for the transmission of the second high-priority packets, and wherein the first high-priority time-bands and the second high-priority time-bands do not overlap.

14. The method of claim 13 further comprising receiving a second data stream that comprises a plurality of second high-priority packets and a plurality of second low-priority packets, wherein the second low-priority packets are received within a plurality of second low-priority time-bands for the second data stream, wherein the second low-priority time-bands represent assigned time intervals within the periodic time window designated for the transmission of the second low-priority packets, and wherein the first low-priority time-bands and the second low-priority time-bands overlap.

15. The method of claim 14, wherein the first low-priority packets and first high priority packets are encapsulated using an Open Systems Interconnection (OSI) layer 2 header, wherein a first encapsulated low-priority packet comprises a portion of the truncated low-priority packet, and wherein a second encapsulated low-priority packet comprises a remaining portion of the truncated low-priority packet.

16. The method of claim 12 further comprising:
   delineating the start of the first high-priority packet with a start special character; and
   delineating the start of the first low-priority packet with a second start special character.

* * * * *

UNITED STATES PATENT AND TRADEMARK OFFICE
CERTIFICATE OF CORRECTION

Page 1 of 2

PATENT NO. : 8,605,757 B2
APPLICATION NO. : 12/842794
DATED : December 10, 2013
INVENTOR(S) : Serge Francois Fourcand It is certified that error appears in the above-identified patent and that said Letters Patent is hereby corrected as shown below:

Title Page 3, References Cited, under Other Publications, the following cited art should read:

"Office Action - Notice of Allowance - dated Dec. 29, 2009, 16 pages, U.S. Appl. No. 11/737,803, filed Apr. 20, 2007.

Notice of Allowance dated Apr. 11, 2011, 7 pages, U.S. Appl. No. 11/735,602, filed Apr. 16, 2007."

Title Page 4, References Cited, under Other Publications, the following cited art should read:

"Foreign Communication From a Related Counterpart Application, Chinese Application 200880001609.3, Chinese Office Action dated Oct. 28, 2011, 4 pages.

Foreign Communication From a Related Counterpart Application, Chinese Application 200880002509.2, Chinese Office Action dated May 19, 2011, 4 pages.

Notice of Allowance dated Oct. 16, 2012, 42 pages, U.S. Appl. No. 12/691,367, filed Jan. 21, 2010."

In the Claims:

Column 12/Line 61 should read: "determine a periodic transmission window to transmit"

Column 12/Line 67 should read: "ity of low priority packets;"

Column 13/Line 8 should read: "packets in subsequent high-priority time-bands;"

Column 13/Line 10 should read: "packets in subsequent low-priority time-bands;"

Column 14/Line 1 should read: "band, wherein some of the first high-priority packets are trans-"

Signed and Sealed this
Twenty-fifth Day of March, 2014

Michelle K. Lee
*Deputy Director of the United States Patent and Trademark Office*

CERTIFICATE OF CORRECTION (continued)
U.S. Pat. No. 8,605,757 B2

Column 14/ Line 3 should read: "some of the first high-priority packets are transmitted within a"

Column 14/Line 35 should read: "wherein a remainder of the truncated high-priority packets"

Column 14/Line 36 should read: "are placed in subsequent first high-priority time-bands,"

Column 14/Line 37 should read: "wherein a remainder of the truncated low-priority packets are"

Column 14/Line 38 should read: "placed in subsequent first low-priority time-bands,"